United States Patent

Bonhomme et al.

[11] Patent Number: 5,725,763
[45] Date of Patent: Mar. 10, 1998

[54] VACUUM FILTRATION DEVICE SEALABLE VACUUM VENT

[75] Inventors: Louis L. Bonhomme, Waltham; Donald B. Rising, Stow, both of Mass.

[73] Assignee: Millipore Corporation, Bedford, Mass.

[21] Appl. No.: 670,752

[22] Filed: Jun. 24, 1996

[51] Int. Cl.$^6$ ............................................ B01D 35/137
[52] U.S. Cl. .................... 210/188; 210/406; 210/416.1; 210/436; 422/101
[58] Field of Search ................. 210/120, 323.1, 210/406, 416.1, 436, 445, 472–475, 477, 188; 422/101

[56] References Cited

U.S. PATENT DOCUMENTS

| | | |
|---|---|---|
| 3,844,895 | 10/1974 | Rose et al. |
| 4,301,010 | 11/1981 | Eddleman et al. .................... 210/406 |
| 4,357,240 | 11/1982 | Mehra et al. ......................... 210/455 |
| 4,614,585 | 9/1986 | Mehra et al. ......................... 210/445 |
| 4,673,501 | 6/1987 | Wells et al. .......................... 210/406 |
| 5,141,639 | 8/1992 | Kraus et al. ......................... 210/406 |
| 5,234,585 | 8/1993 | Zuk ..................................... 210/472 |
| 5,603,900 | 2/1997 | Clark et al. .......................... 210/406 |

*Primary Examiner*—Joseph W. Drodge
*Attorney, Agent, or Firm*—John Dana Hubbard; Timothy J. King

[57] ABSTRACT

Disclosed is a vacuum filtration device including; (a) filter body including a filter membrane; (b) a passageway extending through the body and communicating with the upstream side of the filter for receiving a fluid to be filtered; (c) a junction mounted on the body on the downstream side of the filter and adapted to receive a closed container for receiving the filtered fluid and including sealing for creating a fluid tight seal between the container and the body; (d) a vacuum port communicating with said junction and adapted to be connected to a vacuum source for drawing the fluid through the filter and comprising a sealable vacuum vent which, when open, provides fluid communication between the vacuum port and a gas source. The device also includes a vacuum vent cap and a filter body vent and vent cap.

11 Claims, 5 Drawing Sheets

VACUUM FILTRATION DEVICE SEALABLE VACUUM VENT

BACKGROUND OF THE INVENTION

Filtration of a liquid during transfer from a supply container to a receiving container is typically driven by a pressure difference between the two containers. The pressure difference can be created by pressurizing the supply container, by interposing a pump between the supply container and the filter, or by applying vacuum to the receiving container.

In the laboratory, sterile filtering is usually done under a protective hood, with filtered air circulated across the work area to maintain a germ-free environment. A sterilized filtration device is placed in or near the hood. One end of a supply tube is generally connected to the filtration device and other end is placed in the supply container. For vacuum filtration, the filtration device includes a connection for a vacuum line which communicates with the receiving or filtrate container and a vacuum source, such as a vacuum pump or a water aspirator. Vacuum filtration devices cannot easily be used if clamped in a fixed position, because such devices must be sealed to the opening of the receiving container in order to create a vacuum in the receiving container. This is more simply done by placing the filtration device on the container than by holding the container against a fixed filtration device.

In assembling the equipment, the operator removes a cap from a sterile receiving vessel, attaches the receiving vessel to the filtration unit, and begins the filtration process by applying the vacuum, evacuating the receiving vessel and initiating liquid flow through the filter. Liquid flow is interrupted by removing the tube from the supply, or by interrupting or turning off the vacuum source.

Several disadvantages are associated with vacuum filtration. For example, it is difficult to control the volume of liquid filtered into a container. A shut-off valve can be placed in the vacuum line, or the vacuum tubing can be pinched shut, but residual vacuum in the container will cause liquid flow to continue at a gradually decreasing rate. Alternatively, the vacuum tubing can be pulled from the filtration device to stop filtration by allowing air to vent into the container. Since this method is abrupt, liquid level control is difficult to achieve. Similarly, a vacuum line shut-off valve can have a vent port, but the venting still is abrupt and difficult to control. In addition, all of the above control methods are awkward, as they require that the operator keep one hand on the filtration device and use the other hand to operate the valve or remove the tubing. Throughout the filtration process, the operator generally must hold the receiving container cap to prevent its inner surfaces from being contaminated, as the work surface of the hood and other laboratory surfaces are considered contaminated. Thus, the operator is busy unscrewing and reapplying the receiving vessel cap, holding the cap and operating separate valves and/or switches.

In addition, air trapped in the vacuum filter housing cannot be vented to the atmosphere by conventional means because the pressure within the housing is less than atmospheric pressure. In open, funnel-type devices this is not a problem, because air cannot be trapped, but in devices closed to the atmosphere trapped air can block the filter membrane and reduce the filtration rate. Several vacuum filtration devices, such as those described in U.S. Pat. Nos. 3,844,895 and 5,141,639, use a filter with a hydrophobic area or a separate hydrophobic filter to allow air to pass to the vacuum side of the filter. However, some liquids, such as those containing blood serum, will occlude a hydrophobic filter membrane and render it useless.

There is, thus, a need for a means to control the fluid and/or air flow in a vacuum filtration device. There is also a need for a means to reliably vent air from a filtration device in the presence of liquids which can occlude a hydrophobic filter.

SUMMARY OF THE INVENTION

The present invention provides a vacuum control valve for manually controlling pressure in a vacuum device, such as a vacuum filtration device. In one embodiment, the vacuum control valve comprises (a) an inlet adapted to receive a vacuum port, (b) an outlet in fluid communication with the inlet and adapted to receive a vacuum source; (c) a vacuum vent providing fluid communication among the inlet, the outlet and a gas source; and (d) a vent cap movably mounted to the vacuum vent and capable of sealing the vacuum vent from the gas source.

The vent cap can be formed of a resilient and flexible, for example, elastomeric, material and, when manually deformed, is displaced from the vacuum vent, thereby opening the vacuum vent. The vent cap can include a projection or tab for actuating the valve such that applying a lateral or axial force to the tab deforms the vent cap, displacing it from the vacuum vent and opening the vacuum vent to the atmosphere.

In another embodiment, the present invention provides a vacuum control valve body, comprising (a) a conduit providing fluid communication between a vacuum port and a vacuum source, (b) a vacuum vent providing fluid communication between the conduit and a gas source; and (c) a vent cap movably mounted to the vacuum vent such that the vent cap seals the vacuum vent from the gas source when seated on the vacuum vent.

Another embodiment of the present invention is a vacuum filtration device including (a) a filter body having a filter secured within the body; (b) a passageway extending through the body and communicating with the upstream side of the filter for receiving a fluid to be filtered; (c) a junction mounted on the body on the downstream side of the filter, with the junction adapted to receive a closed container for receiving the filtered fluid and including sealing means for creating a fluid tight seal between the container and the body; (d) a vacuum port communicating with the downstream side of the filter, the port adapted to be connected to a vacuum source for drawing the fluid through the filter into the container and comprising a sealable vacuum vent which, when open, provides fluid communication between the vacuum port and a gas source.

DETAILED DESCRIPTION OF THE INVENTION

The features and other details of the invention will now be more particularly described and pointed out in the claims. It will be understood that the particular embodiments of the invention are shown by way of illustration and not as limitations of the invention. The principal features of the invention can be employed in various embodiments without departing from the scope of the present invention.

The present invention includes a vacuum control valve for controlling the pressure within a vacuum device, particularly a vacuum filtration device. Such a device, typically, comprises an inlet chamber and a filtrate container separated from each other by a filter membrane. The filtrate chamber communicates with a vacuum port which can be connected to a vacuum line, for example, a line to an aspirator or a vacuum pump. This allows evacuation of the filtrate chamber, establishing a pressure difference across the filter membrane which drives fluid flow through the membrane. The filtration rate, thus, correlates with this pressure difference unless the filter membrane is blocked. One example of such a vacuum filtration device is disclosed in commonly owned U.S. patent application Ser. No. 08/444,493, filed on May 19, 1995, the contents of which are incorporated herein by reference. Other vacuum filtration devices available for laboratory use include those described in U.S. Pat. Nos. 5,141,639; 4,301,010; 4,673,501; 4,614,585 and 3,844,895. The vacuum control device of the present invention can be used to adjust the vacuum applied to the filtrate container, and, thus, the pressure difference across the filter membrane and the filtration rate.

In one embodiment, the vacuum control valve comprises (a) an inlet adapted to receive a vacuum port, (b) an outlet in fluid communication with the inlet, with the outlet adapted to receive a vacuum source; (c) a vacuum vent providing fluid communication among the inlet, the outlet and a gas source; and (d) a vent cap movably mounted to the vacuum vent capable of sealing the vacuum vent from the gas source.

The vacuum vent is located intermediate the inlet and the outlet and can be, for example, a hole or elongated conduit which opens to a gas source and can be sealed, isolating the inlet and outlet from the gas source. When the vacuum vent is sealed, the vacuum source can establish a vacuum within the vacuum device, with the minimum pressure achievable dependent upon the vacuum source and the dimensions and construction of the filtration device. When the vacuum vent is fully open, gas can enter the vacuum vent, and, therefore, the vacuum device, increasing the pressure (i.e., decreasing the vacuum) within the vacuum device. The limiting pressure attainable within the vacuum device depends upon the gas source, the vacuum source, the dimensions of the vent, and the dimensions and construction of the vacuum device. Vacuum device pressures intermediate those resulting from a sealed vacuum vent and a fully open vacuum vent can be obtained by partially opening the vacuum vent.

The vacuum vent can be sealed, totally or partially, by the vent cap, which is mounted to the vacuum vent. The vent cap can, for example, cover the exterior opening of the vacuum vent. The cap is, preferably, formed of a flexible, for example, elastomeric, material and is manually deformable to open the vacuum vent. In other embodiments, the cap can be manufactured from a rigid material. Preferably, the cap seals the vacuum vent in the resting position, thereby excluding the gas from the vacuum device. The cap can include a projection or tab for actuating the valve such that applying a force, such as a lateral force or an axial force, to the tab or projection deforms the cap and displaces it from the vacuum vent, opening, partially or completely, the vacuum vent to the gas source. The extent of deformation of the cap, and, thus, the extent of opening of the vacuum vent, can correlate with the amount of force applied to the tab. Thus, the operator can control the pressure within the vacuum device by adjusting the pressure applied to the tab. In a preferred embodiment, the operator can deform the cap, and, thus, totally or partially open the vacuum vent, by pressing on the tab with a finger.

The vent cap can further include a tang or post which extends into the vacuum vent. The post can serve to secure the vent cap to the vacuum vent and can also partially obstruct air flow from the inlet to the outlet, thereby serving as a flow restrictor. The post can also extend through an anchoring hole intermediate the inlet and the outlet and terminate in a retention flange which secures the post to the anchoring hole.

In another embodiment, the present invention provides a vacuum control valve body, comprising (a) a conduit providing fluid communication between a vacuum port and a vacuum source, (b) a vacuum vent providing fluid communication between the conduit and a gas source; and a vent cap movably mounted to the vacuum vent such that the vent cap seals the vacuum vent from the gas source when seated to the vacuum vent.

The foregoing embodiments of the present invention provide vacuum control valves which can be interposed between the vacuum port of an existing vacuum device and a vacuum source. Thus, the vacuum control valve need not be an integral component of the vacuum device, but can be connected to the device and used as needed. For example, the vacuum control valve of the present invention can be connected to a prior art vacuum filtration device which otherwise has no satisfactory means of intermittently regulating pressure within the receiving container, and, hence, the filtration rate.

Another embodiment of the present invention is a vacuum filtration device having a vacuum control valve as an integral component of the device. In one embodiment, the vacuum filtration device of the present invention includes (a) a filter body having a filter secured within the body; (b) a passageway extending through the body and communicating with the upstream side of the filter for receiving a fluid to be filtered; (c) a junction mounted on the body on the downstream side of the filter, with the junction adapted to receive a closed container for receiving the filtered fluid and including sealing means for creating a fluid tight seal between the container and the body; (d) a vacuum port communicating with the downstream side of the filter, the port being adapted to be connected to a vacuum source for drawing the fluid through the filter into the container and comprising a sealable vacuum vent which, when open, provides fluid communication between the vacuum port, and, hence, the filtrate container, and a gas source.

The "downstream side" of the filter refers to the volume within the filtration device on the side of the filter membrane to which the filtrate container is attached. Preferably, the vacuum port communicates with the downstream side of the filter in such a way that, upon applying vacuum, the filtrate is collected in the filtrate container and is not drawn into the vacuum port. The term "upstream side" of the filter is the volume within the filtration device which is on the side of the filter membrane opposite the downstream side.

The gas source with which the vacuum vent communicates can be any source of positive pressure relative to the vacuum generated within the vacuum device, for example, a vacuum filtration device. Suitable gas sources include ambient, for example, laboratory, atmosphere, the atmosphere inside an inert atmosphere chamber, such as a glove box, or a source of pressurized gas, such as an air compressor or a compressed gas cylinder, for example, an air, nitrogen, argon or helium cylinder. Various embodiments of the invention described herein can also include a tube or conduit which communicates with the vacuum vent and is adapted to receive a gas source, such as a line from a compressed gas cylinder.

The vacuum filtration device of the present invention is especially useful for filtering solutions for biological applications, such as tissue culture media, and, in particular, biological solutions which contain serum.

Figure 1A:
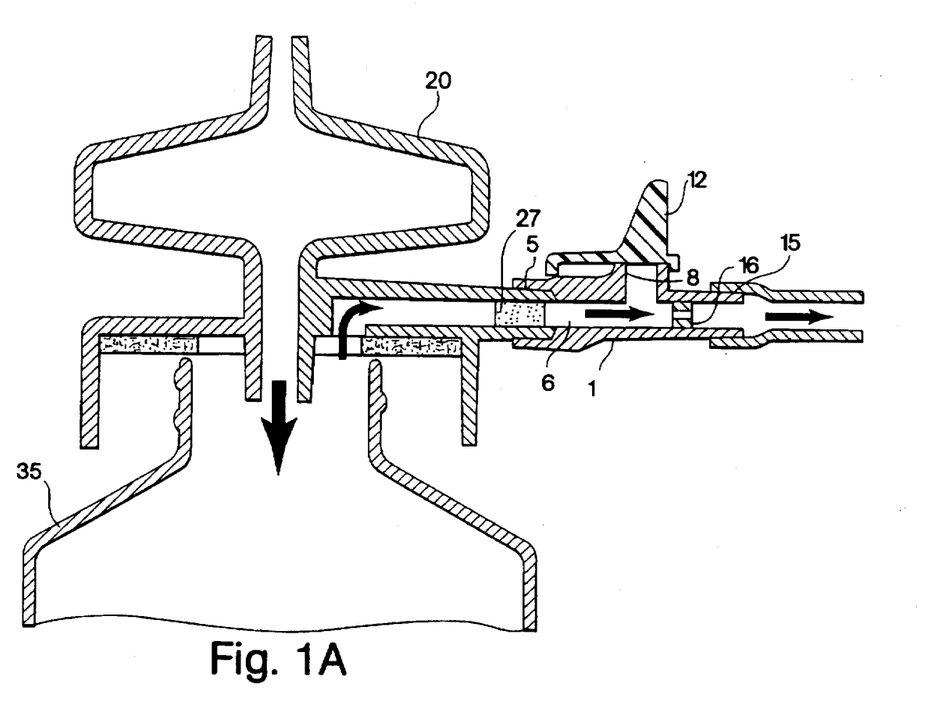
FIG. 1A illustrates a vacuum control valve of the present invention which is shown interposed between the vacuum port of a vacuum filtration device and a vacuum line.
Figure 1B:
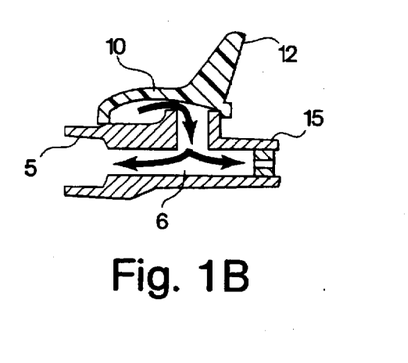
FIG. 1B shows the vacuum control valve in venting mode.

One embodiment of the vacuum control valve of the present invention is shown in FIG. 1. The valve includes elongate body 1, which has conduit 6 with inlet 5 at one end adapted to connect to the vacuum port 19 of a vacuum device, shown generally as 20, and outlet 15 at the other end adapted to connect to a vacuum source. Elongate body 1 has vacuum vent 8 intermediate inlet 5 and outlet 15 which provides fluid communication among the inlet, the outlet and the gas source. Elastomeric vent cap 10 is mounted on the exterior of body 1 and across the external opening of the vacuum vent 8, sealing vacuum vent 8 from the gas source when cap 10 is in the resting position.

Vent cap 10 includes integral outwardly projecting tab 12. As shown in FIG. 1A, applying a lateral force to tab 12 deforms vent cap 10, displacing vent cap 10 from vacuum vent 8 and allowing gas to enter vacuum vent 8. This increases the pressure within the vacuum device 20. The operator can apply pressure to tab 12 by pushing or pressing on tab 12 with a hand or finger. The vent cap 10 can be partially or completely displaced from the vacuum vent. The rate of gas flow into the vacuum port and, hence, the pressure change within the vacuum device, depends upon the extent of displacement, which correlates with the amount of force exerted upon tab 12. Therefore, air flow into the vacuum device, and, thus, the pressure within the vacuum device, can be readily regulated by adjusting the force applied to tab 12.

The vacuum control valve further comprises flow restrictor 5, which is mounted within elongate body 1 adjacent the outlet. Flow restrictor 5 enhances the performance of the valve by decreasing the rate at which the vacuum source can lower the pressure within the vacuum device, thereby increasing the effect of airflow through the vacuum vent upon the pressure within the vacuum device.

Figure 2A:
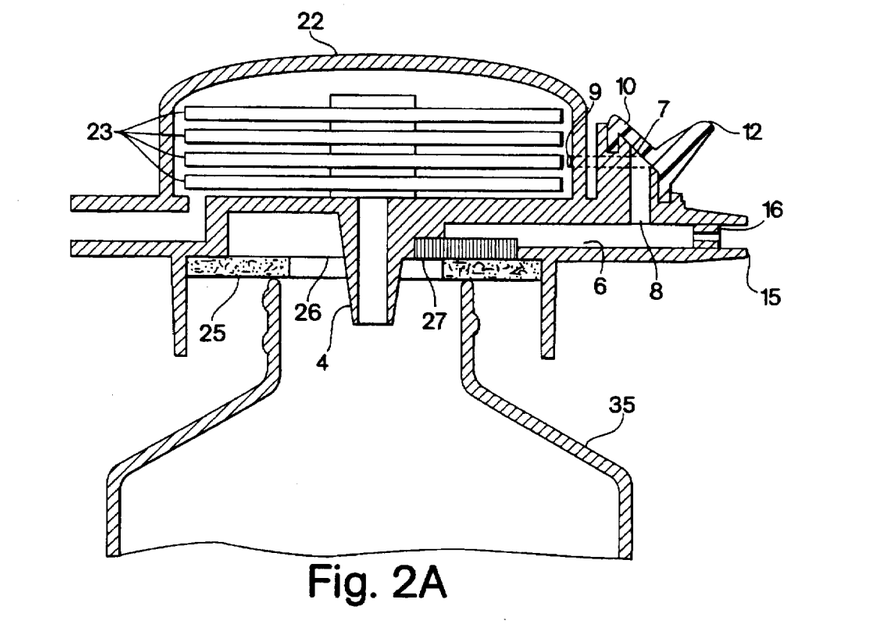
FIG. 2A shows a vacuum filtration device of the present invention which includes a filter housing vent as well as a vacuum vent.
Figure 2B:
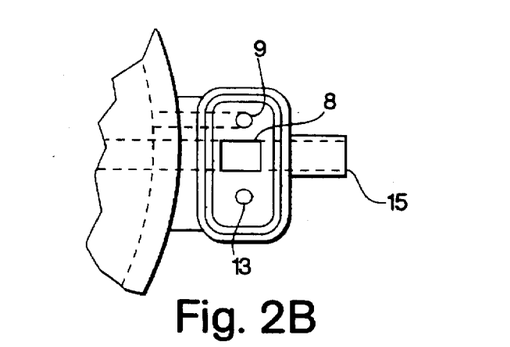
FIG. 2B provides a top view of the valve assembly with the vent cap removed.
Figure 2C:
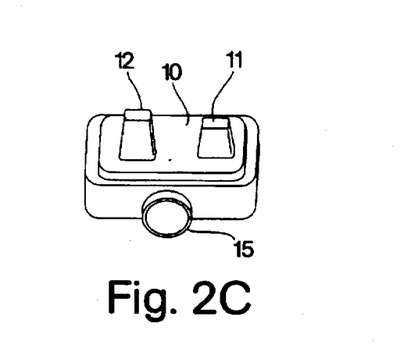
FIG. 2C shows a vent cap with a vacuum vent tab and a filter housing vent tab.

In another embodiment, shown in FIGS. 2A, 2B and 2C, the invention provides a vacuum filtration device which includes a vacuum control valve. The vacuum filtration device includes standard elements for such devices, as described above, including liquid inlet 21 which communicates with the interior of filter housing 22. The device further includes filter disks 23 mounted within filter housing 22. Outlet 24 provides fluid communication with filtrate container 35, which can be connected via a fluid tight seal, provided in this embodiment by foam pad 25, to the outlet, or downstream, side of the filtration device. Vacuum port 6 communicates with the region 26 surrounding outlet 24 and has outer end 15 which is adapted to receive a vacuum source. Vacuum port 6 further includes upwardly projecting member 7 adjacent the external surface of filter housing 22. Vacuum vent 8 is a conduit extending from vacuum port 6 and opening to the gas source by means of aperture 13, as will be described. Filter housing vent 9 is a conduit which extends through upwardly projecting member 7 and provides fluid communication between filter housing 22 and vacuum vent 8 in a manner to be described. Vent cap 10 is situated such that in the resting position it covers aperture 13 and the exterior end of filter housing vent 9, sealing both vents.

Vent cap 10 includes filter housing vent tab 11 and vacuum vent tab 12, and is illustrated in FIG. 2C. Vent cap 10 is designed such that applying a force to filter housing vent tab 11 displaces vent cap 10 from filter housing vent 9, thereby opening, partially or completely, a path connecting filter housing vent 9 to vacuum vent 8 and, thus, to vacuum port 6, while vent cap 10 continues to seal aperture 13. Likewise, aperture 13 can be opened partially or completely by applying a force to vacuum vent tab 12, thereby partially or completely opening a path connecting aperture 13 and vacuum vent 8 and, thus, vacuum port 6, without opening filter housing vent 9.

Figure 3:
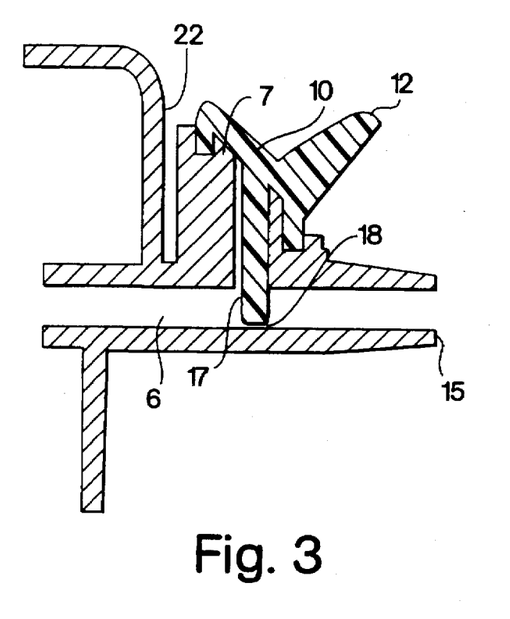
FIG. 3 shows a portion of a vacuum filtration device of the present invention having a post which extends through the vacuum vent and into the vacuum port.

Another embodiment of the invention, depicted in FIG. 3, is a vacuum filtration device which includes elements which are not shown which are standard for a vacuum filtration device, such as have been described above. The device includes filter housing 22. A first end of vacuum port 6 communicates with the region surrounding the outlet of the filtration device, as described above, while a second end 15 is adapted to receive a vacuum source. Vacuum vent 8 provides fluid communication between vacuum port 6 and a gas source, and includes upwardly projecting member 7. Flexible vent cap 10 is mounted to upwardly projecting member 7. In resting mode, vent cap 10 covers the exterior opening of vacuum vent 8, sealing vacuum vent 8 from the gas source. Vent cap 10 has outwardly projecting tab 12, such that when a lateral force is applied to tab 12, vent cap 10 is deformed, thereby opening, partially or completely, vacuum vent 8 and allowing gas to enter the filtrate container via vacuum vent 8. Vent cap 10 further includes post 17, which is attached to the underside of vent cap 10 and extends into vacuum port 6 where it is wedged against the interior walls of the vacuum port 6, thereby securing vent cap 10 to vacuum vent 8. As shown, post 17 does not completely block the interior of the vacuum port, thereby forming passage 18, and, in this embodiment, can serve as a flow restrictor.

Figure 4:
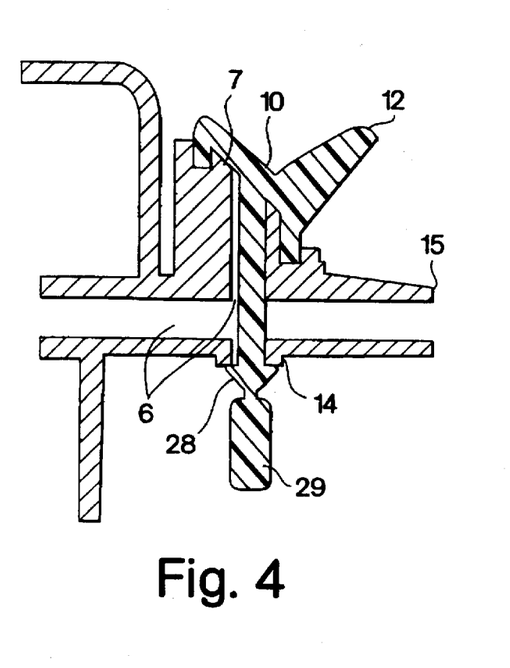
FIG. 4 shows a portion of a vacuum filtration device of the present invention having a post which extends into the vacuum port and through an anchoring hole in the vacuum port opposite the vacuum vent and is secured with a retention flange.

The embodiment of the vacuum control valve depicted in FIG. 4 is similar to that shown in FIG. 3, except that post 17 extends into vacuum port 6 and through anchoring hole 14 in the vacuum port opposite vacuum vent 8. Post 17 is secured by retention flange 28 as shown. Post 17 can further include break-off installation tab 29, which is frangibly connected to retention flange 28 and facilitates insertion of post 17 into vacuum vent 8 and through anchoring hole 14. Installation tab 29 can then be broken off and removed. Post 17 can further include a hole or slot to allow gas flow through the vacuum port, and can, thus, serve as a flow restrictor.

Figure 5A:
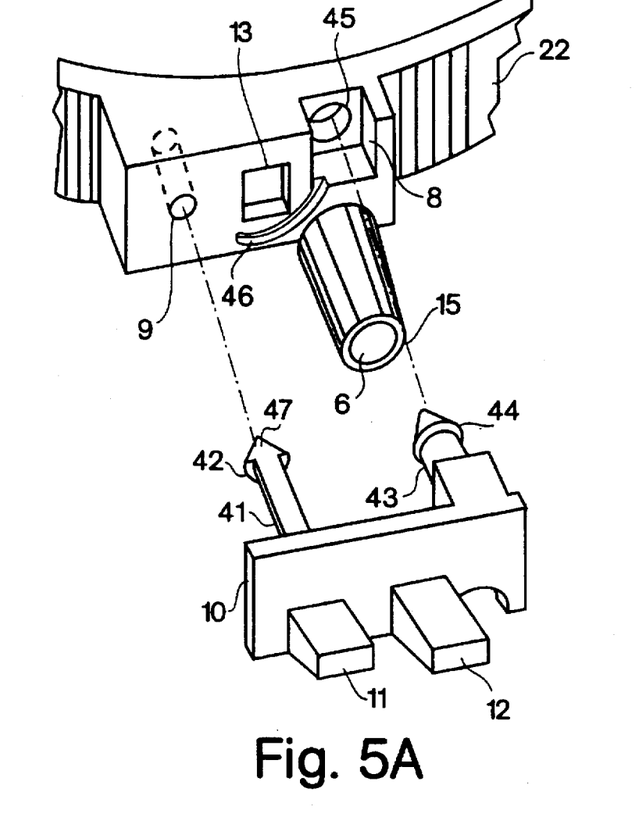
FIG. 5A shows a vacuum control device of the present invention having a vent cap secured to the filter housing by posts.
Figure 5B:
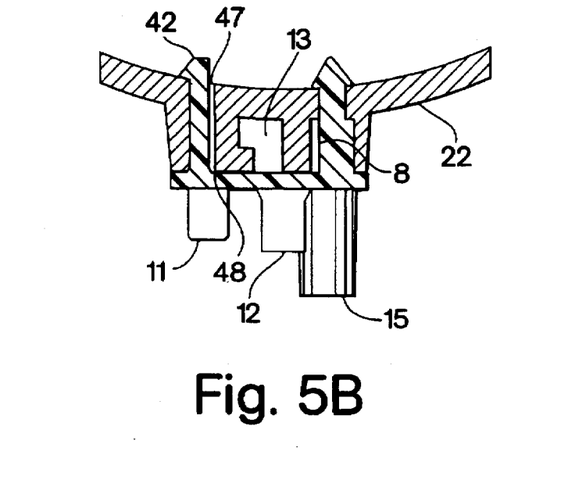
FIG. 5B provides a cross sectional view of the vent cap secured to the filter housing.

Another embodiment of the vacuum filtration device of the present invention is shown in FIGS. 5A and 5B. The device includes elements which are standard for a vacuum filtration device, such as those described previously, including filter housing 22 and vacuum port 6. Flexible vent cap 10 is secured to the filter housing by integral post 41, which extends through filter housing vent 9 and into the interior of filter housing 22, where it is secured by retention flange 42. Vent cap 10 is further secured to filter housing 22 by post 43, which extends through vacuum vent 8, and into anchoring hole 45, within which it is secured by retention flange 44. Vent cap 10 includes filter housing vent tab 11 and vacuum vent tab 12.

Filter housing vent tab 11 is situated such that upon application of an lateral force to filter housing vent tab 11, vent cap 10 is deformed and displaced from the filter housing vent port seat 48, thereby opening a path providing fluid communication between filter housing 22 and the vacuum passage, while aperture 13 remains closed. Post 41 can have flat portion 47 to facilitate fluid flow. Vacuum vent tab 12 is situated such that applying an axial force to tab 12 opens aperture 13, allowing gas flow from the gas source into vacuum vent 8 and, thus, into vacuum port 6.

Figure 6A:
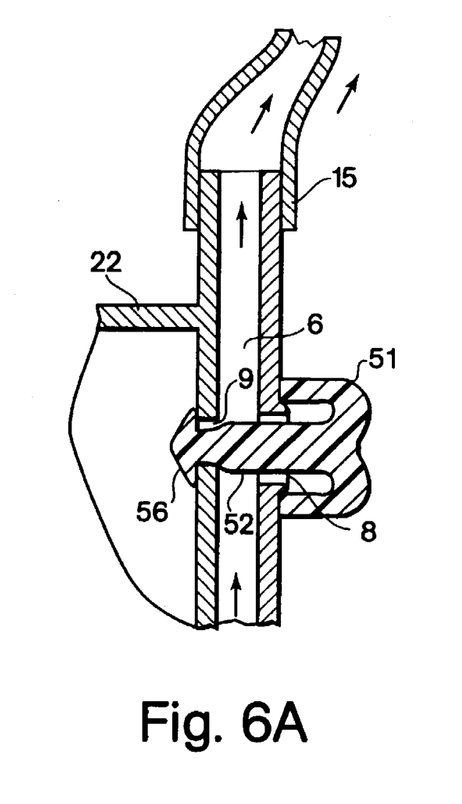
FIG. 6A illustrates a vacuum filtration device of the present invention having a post extending into the vacuum port and through a filter housing vent.
Figure 6B:
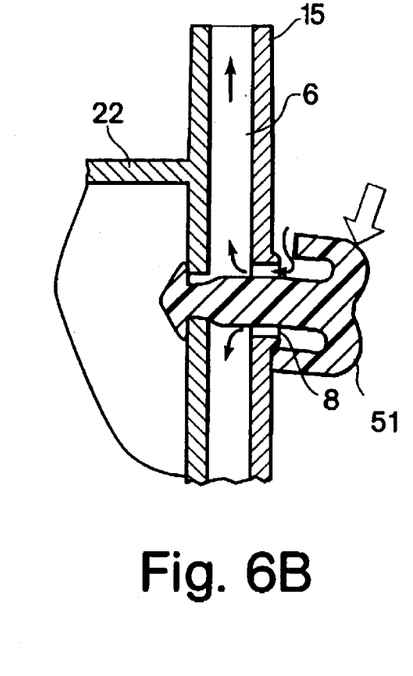
FIG. 6B shows the vent cap displaced from the vacuum vent by the application of a lateral force.
Figure 6C:
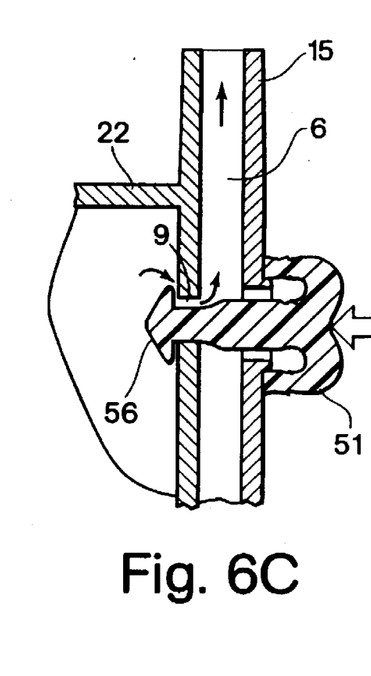
FIG. 6C shows the vent cap displaced from the filter housing vent by application of an axial force.

Yet another embodiment of the vacuum filtration device of the present invention is shown in FIGS. 6A, 6B and 6C. The figures do not show included elements which are standard for a vacuum filtration device, as discussed above. Vacuum port 6 includes vacuum vent 8. Filter housing vent 9 provides fluid communication between vacuum port 6 and the interior of filter housing 22. Flexible vent cap 51 includes post 52 which extends into vacuum vent 8 and through filter housing vent 9, where it is secured by retention flange 56, thereby sealing filter housing vent 9. Post 52 is tensioned to cause vent cap 51 to seal vacuum vent 8 when it is in the resting position.

Applying a lateral force to vent cap 51, as shown in FIG. 6B, deforms the vent cap, displacing it from vacuum vent 8 and opening vacuum vent 8 to the gas source. Applying an axial force to vent cap 51, as shown in FIG. 6C, pushes retention flange 56 away from filter housing vent 9, opening a path from filter housing 22 to vacuum port 6 and allowing air to be vented from filter housing 22. Thus, filter housing vent 9 and vacuum vent 8 can be opened and closed independently of each other using a single vent cap.

Equivalents

Those skilled in the art will recognize or be able to ascertain using no more than routine experimentation many equivalents to the specific embodiments of the invention described herein. Such equivalents are intended to be encompassed in the scope of the following claims.

We claim:

1. A vacuum filtration device, comprising:
   (a) filter body having a filter secured within said body;
   (b) passageway extending through said body and communicating with the upstream side of said filter for receiving a fluid to be filtered;
   (c) a junction mounted on said body on the downstream side of said filter, said junction being adapted to receive a closed container and including sealing means for creating a fluid tight seal between said container and said body, said container for receiving the filtered fluid; and
   (d) a vacuum port communicating with said junction, said port being adapted to receive a vacuum source for drawing said fluid through said filter into said container and comprising a sealable and openable vacuum vent which is constructed and arranged to provide, when open,
   fluid communication among said container, said vacuum source and a gas source.

2. The vacuum filtration device of claim 1 further comprising a filter body vent providing fluid communication between the upstream side of the filter and said vacuum source.

3. The vacuum filtration device of claim 2 wherein a hydrophobic filter is mounted to said filter body vent.

4. The vacuum filtration device of claim 2 further comprising a filter body vent cap movably mounted to said filter body vent.

5. A vacuum filtration device, comprising:
   (a) a filter body having a filter secured within said body;
   (b) a passageway extending through said body and communicating with the upstream side of said filter for receiving a fluid to be filtered;
   (c) a junction mounted on said body on the downstream side of said filter, said junction being adapted to receive a closed container and including sealing means for creating a fluid tight seal between said container and said body, said container for receiving the filtered fluid;
   (d) a vacuum port communicating with said junction, said port being adapted to receive a vacuum source for drawing said fluid through said filter into said container and comprising a sealable and openable vacuum vent which is constructed and arranged to provide when open, fluid communication between said container and a gas source; and
   (e) a vent cap movably mounted to said vacuum vent.

6. The vacuum filtration device of claim 5 wherein said vent cap is elastomeric and said vacuum vent is opened by manually deforming said vent cap.

7. The vacuum filtration device of claim 6 wherein said vent cap further comprises a tab for opening said vacuum vent, such that applying a lateral force to said tab unseats said vent cap from said vacuum vent.

8. The vacuum filtration device of claim 7 wherein said vent cap further comprises a post for securing said vent cap to said vacuum vent.

9. A vacuum filtration device, comprising:
   (a) a filter body having a filter secured within said body;
   (b) a passageway extending through said body and communicating with the upstream side of said filter for receiving a fluid to be filtered;
   (c) a junction mounted on said body on the downstream side of said filter, said junction being adapted to receive a closed container and including sealing means for creating a fluid tight seal between said container and said body, said container for receiving the filtered fluid;
   (d) a vacuum port communicating with said junction, said port being adapted to receive a vacuum source for drawing said fluid through said filter into said container and comprising a sealable and openable vacuum vent which is constructed and arranged to provide, when open, fluid communication between said container and a gas source;

(e) a filter body vent providing fluid communication between the upstream side of the filter and the vacuum source; and (f) a vent cap movably mounted to said filter body vent and said vacuum vent, such that said filter body vent and said vacuum vent are each independently sealed by said vent cap.

10. The vacuum control valve of claim 9 wherein said vent cap further comprises a filter body tab for opening said filter body vent such that applying a force to said filter body tab deforms said vent cap, thereby displacing said vent cap from said filter body vent and opening said filter body vent.

11. The vacuum control valve of claim 9 wherein said filter body vent is opened by applying a force to said vent cap in a first direction and said vacuum vent is opened by applying a force to said vent cap in a second direction, said first direction and said second direction being substantially orthogonal.

* * * * *